United States Patent
Smith et al.

(10) Patent No.: US 7,415,638 B2
(45) Date of Patent: Aug. 19, 2008

(54) PRE-DECODE ERROR HANDLING VIA BRANCH CORRECTION

(75) Inventors: Rodney Wayne Smith, Raleigh, NC (US); Brian Michael Stempel, Raleigh, NC (US); James Norris Dieffenderfer, Apex, NC (US); Jeffrey Todd Bridges, Raleigh, NC (US); Thomas Andrew Sartorius, Raleigh, NC (US)

(73) Assignee: QUALCOMM Incorporated, San Diego, CA (US)

(*) Notice: Subject to any disclaimer, the term of this patent is extended or adjusted under 35 U.S.C. 154(b) by 705 days.

(21) Appl. No.: 10/995,858

(22) Filed: Nov. 22, 2004

(65) Prior Publication Data

US 2006/0123326 A1    Jun. 8, 2006

(51) Int. Cl.
*G06F 11/00* (2006.01)
*G06F 9/30* (2006.01)

(52) U.S. Cl. ........................ 714/49; 712/213
(58) Field of Classification Search .................. 714/49, 714/54; 712/213
See application file for complete search history.

(56) References Cited

U.S. PATENT DOCUMENTS

| | | | | |
|---|---|---|---|---|
| 5,634,136 A | * | 5/1997 | Ohshima et al. | 712/237 |
| 5,850,532 A | * | 12/1998 | Narayan et al. | 712/213 |
| 6,092,182 A | * | 7/2000 | Mahalingaiah | 712/213 |
| 6,260,134 B1 | * | 7/2001 | Zuraski et al. | 712/210 |
| 6,360,317 B1 | * | 3/2002 | Mahalingaiah et al. | 712/233 |
| 6,460,132 B1 | * | 10/2002 | Miller | 712/213 |
| 6,502,185 B1 | * | 12/2002 | Keller et al. | 712/213 |
| 6,631,463 B1 | * | 10/2003 | Floyd et al. | 712/227 |
| 6,804,799 B2 | * | 10/2004 | Zuraski, Jr. | 714/54 |
| 6,816,962 B2 | * | 11/2004 | Augsburg et al. | 712/226 |
| 6,952,754 B2 | * | 10/2005 | O'Connor et al. | 711/125 |

FOREIGN PATENT DOCUMENTS

WO      03003218      1/2003

* cited by examiner

*Primary Examiner*—Joshua A Lohn
(74) *Attorney, Agent, or Firm*—Nicholas J. Pauley; Joseph B. Agusta; Thomas Rouse

(57) ABSTRACT

In a pipelined processor where instructions are pre-decoded prior to being stored in a cache, an incorrectly pre-decoded instruction is detected during execution in the pipeline. The corresponding instruction is invalidated in the cache, and the instruction is forced to evaluate as a branch instruction. In particular, the branch instruction is evaluated as "mispredicted not taken" with a branch target address of the incorrectly pre-decoded instruction's address. This, with the invalidated cache line, causes the incorrectly pre-decoded instruction to be re-fetched from memory with a precise address. The re-fetched instruction is then correctly pre-decoded, written to the cache, and executed.

22 Claims, 3 Drawing Sheets

PRE-DECODE ERROR HANDLING VIA BRANCH CORRECTION

BACKGROUND

The present invention relates generally to the field of processor and in particular to a method of correcting erroneous pre-decoded data associated with an instruction by forcing a branch correction procedure with a target address of the instruction.

Microprocessors perform computational tasks in a wide variety of applications. Improved processor performance is almost always desirable, to allow for faster operation and/or increased functionality through software changes. In many embedded applications, such as portable electronic devices, conserving power is also an important goal in processor design and implementation.

Most modern processors may employ a pipelined architecture, where sequential instructions are overlapped in execution to increase overall processor throughput. Maintaining smooth execution through the pipeline is critical to achieving high performance. Most modern processors also utilize a hierarchical memory, with fast, on-chip cache memories storing local copies of recently accessed data and instructions. One pipeline optimization technique known in the art is pre-decoding instructions. That is, instructions are examined as they are read from memory, are partially decoded, and some information about the instructions—known as pre-decode information—is stored in a cache memory along with the associated instructions. When the instructions are later fetched from the cache, the pre-decode information is also fetched, and used to assist in fully decoding the instructions.

Occasionally, the pre-decode information contains errors. These errors may be detected during decode stages in the pipeline. When an error is discovered, an exception occurs, and the pipeline must be flushed and all instructions, including the erroneously pre-decoded instruction, must be re-fetched. This process incurs significant performance and power management degradation.

SUMMARY

The present invention relates in one embodiment to a method of correcting an incorrectly pre-decoded instruction. A pre-decode error is detected. A branch correction procedure is forced, with the target address of the incorrectly pre-decoded instruction, in response to detecting the error.

The present invention relates in another embodiment to a processor. The processor includes a pre-decoder interposed in an instruction fetch path, the pre-decoder generating pre-decode information associated with a particular instruction. The processor also includes a pre-decode error detector and corrector detecting incorrect pre-decode information associated with the instruction, and forcing the instruction to execute as a mis-predicted branch, with a branch target address of the address of the instruction.

DETAILED DESCRIPTION

Pipelined processor architectures exploit parallelism by overlapping the execution of a plurality of sequential instructions, each of which has multiple execution steps. Typical execution steps include Instruction Fetch, Decode, Execute and Write Back. Each step is performed in the pipeline by one or more pipe stages, comprising logic and a memory element such as a latch or register. The pipe stages are connected together to form the pipeline. Instructions enter the pipeline and are successively processed through the stages. Additional instructions enter the pipeline before previous instructions complete execution—hence, multiple instructions may be processed within the pipeline at any given time. This ability to exploit parallelism among instructions in a sequential instruction stream contributes significantly to improved processor performance. Under ideal conditions and in a processor that completes each pipe stage in one cycle, following the brief initial process of filling the pipeline, an instruction may complete execution every cycle. Numerous real-world constraints prevent this ideal condition from being sustained; however, keeping the pipeline full and smoothly flowing is a common goal of processor design.

Commonly modern processors also employ a memory hierarchy that places small amounts of fast, expensive memory close to the processor, backed up by large amounts of slower, inexpensive memory. A typical processor memory hierarchy may comprise registers in the processor at the top level; backed by one or more on-chip cache memories (e.g. SRAM); possibly an off-chip cache memory, referred to as a Level 2 or L2 cache (e.g. SRAM); main memory (commonly DRAM); disk storage (magnetic media); and tape or CD (magnetic or optical media) at the lowest level. In embedded applications, such as portable electronic devices, there may be limited, if any, disk storage, and hence main memory (commonly limited in size) may be the lowest level in the memory hierarchy.

Figure 1:
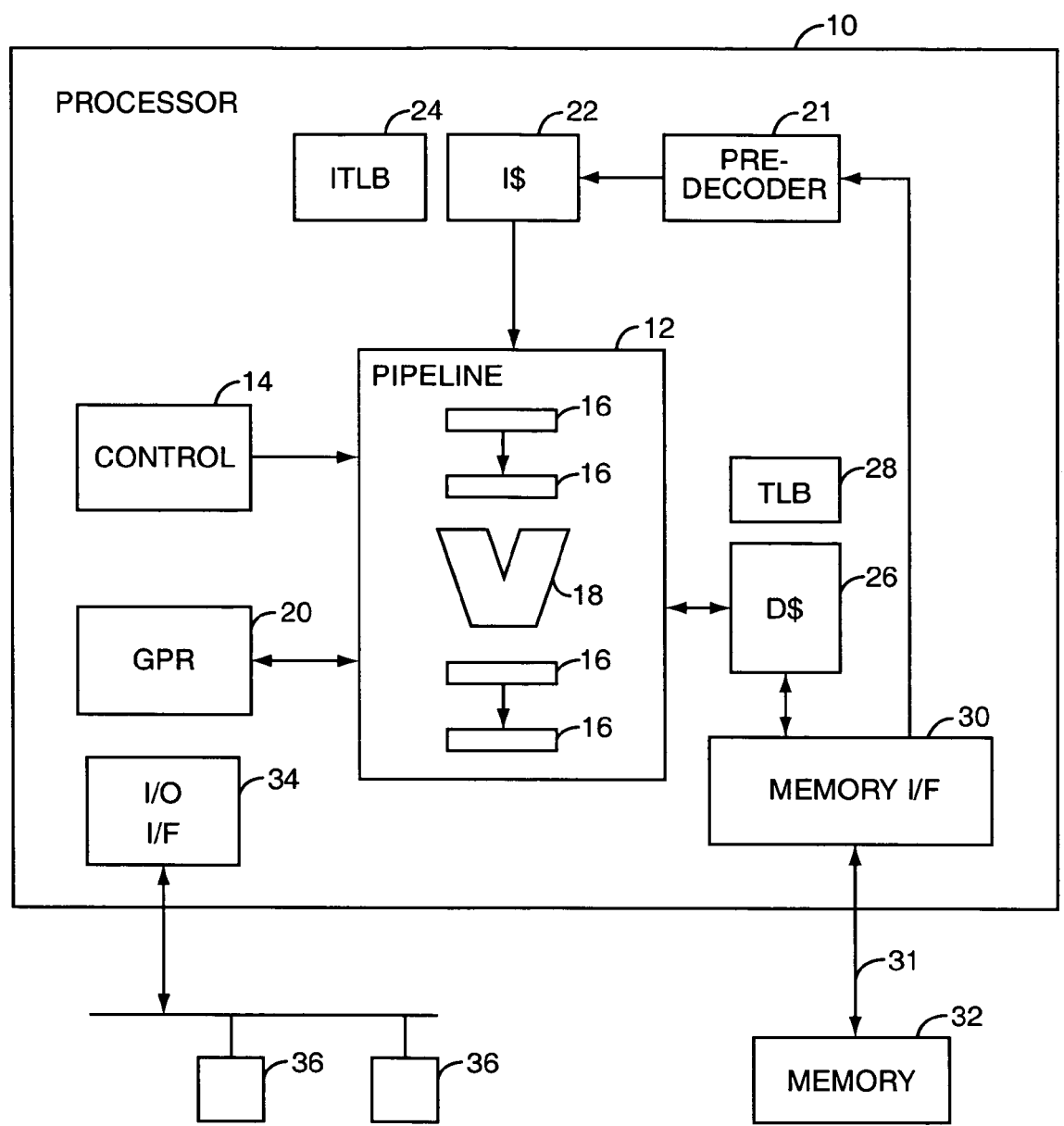
FIG. 1 is a functional block diagram of a processor.

FIG. 1 depicts a functional block diagram of a representative processor 10, employing both a pipelined architecture and a hierarchical memory structure. The processor 10 executes instructions in an instruction execution pipeline 12 according to control logic 14. The pipeline includes various registers or latches 16, organized in pipe stages, and one or more Arithmetic Logic Units (ALU) 18. A General Purpose Register (GPR) file 20 provides registers comprising the top of the memory hierarchy. The pipeline fetches instructions from an Instruction Cache 22, with memory addressing and permissions managed by an Instruction-side Translation Lookaside Buffer (ITLB) 24, and some initial decoding of instructions performed by a pre-decoder 21. Data is accessed from a Data Cache 26, with memory addressing and permissions managed by a main Translation Lookaside Buffer (TLB) 28. In various embodiments, the ITLB may comprise a copy of part of the TLB. Alternatively, the ITLB and TLB may be integrated. Similarly, in various embodiments of the processor 10, the I-cache 22 and D-cache 26 may be integrated, or unified. Accesses which are not present in the I-cache 22 and/or the D-cache 26 (misses) cause an access 31 to main (off-chip) memory 32, under the control of a memory interface 30. The processor 10 may include an Input/Output (I/O) interface 34, controlling access to various peripheral devices 36. Those of skill in the art will recognize that numerous variations of the processor 10 are possible. For example, the processor 10 may include a second-level (L2 cache for either or both of the I and D caches. In addition, one or more of the functional blocks depicted in the processor 10 may be omitted from a particular embodiment.

One known technique for improving processor performance and reducing power consumption is known as pre-decoding. The pre-decoder 21 comprises logic interposed in the path between main memory 32 and an instruction cache 22. Some of the instructions fetched from memory may be pre-decoded, with pre-decode information generated and written to the I-cache 22 along with the instruction. The pre-decode information may assist one or more decode pipe stages in decoding the instruction when it is fetched from the cache for execution. For example, a pre-decoder may determine the length of variable-length instructions, and write pre-decode information into the cache that assists a decode pipe stage to retrieve the correct number of bits for the variable length instruction. A variety of information may be pre-decoded and stored in the I-cache 22.

The pre-decoder 21 improves performance by removing logic from one or more decode pipe stages, allowing an earlier use of the logic, and possibly allowing for a shorter machine cycle time. The pre-decoder 21 also reduces power consumption by performing pre-decode operations once. As I-cache 22 hit rates are commonly in the high 90%, considerable power savings may be realized by eliminating the need to perform logic operations every time an instruction is executed from the I-cache 22.

Occasionally, the pre-decoder 21 makes errors. For example, if data such as parameters or immediate values were stored in memory along with the instructions, a pre-decode operation that determines instruction length by simply counting bytes from the beginning of a cache line may erroneously identify the bytes of one or more such parameters or immediate values as an instruction further down the line. Other types of errors are possible, including random bit errors, either in the pre-decoder 21 or in the I-cache 22. These errors should be discovered in one or more decode pipe stages, and will normally cause an exception, requiring the pipeline to be flushed and restarted thereby incurring performance and power consumption penalties.

Figure 2:
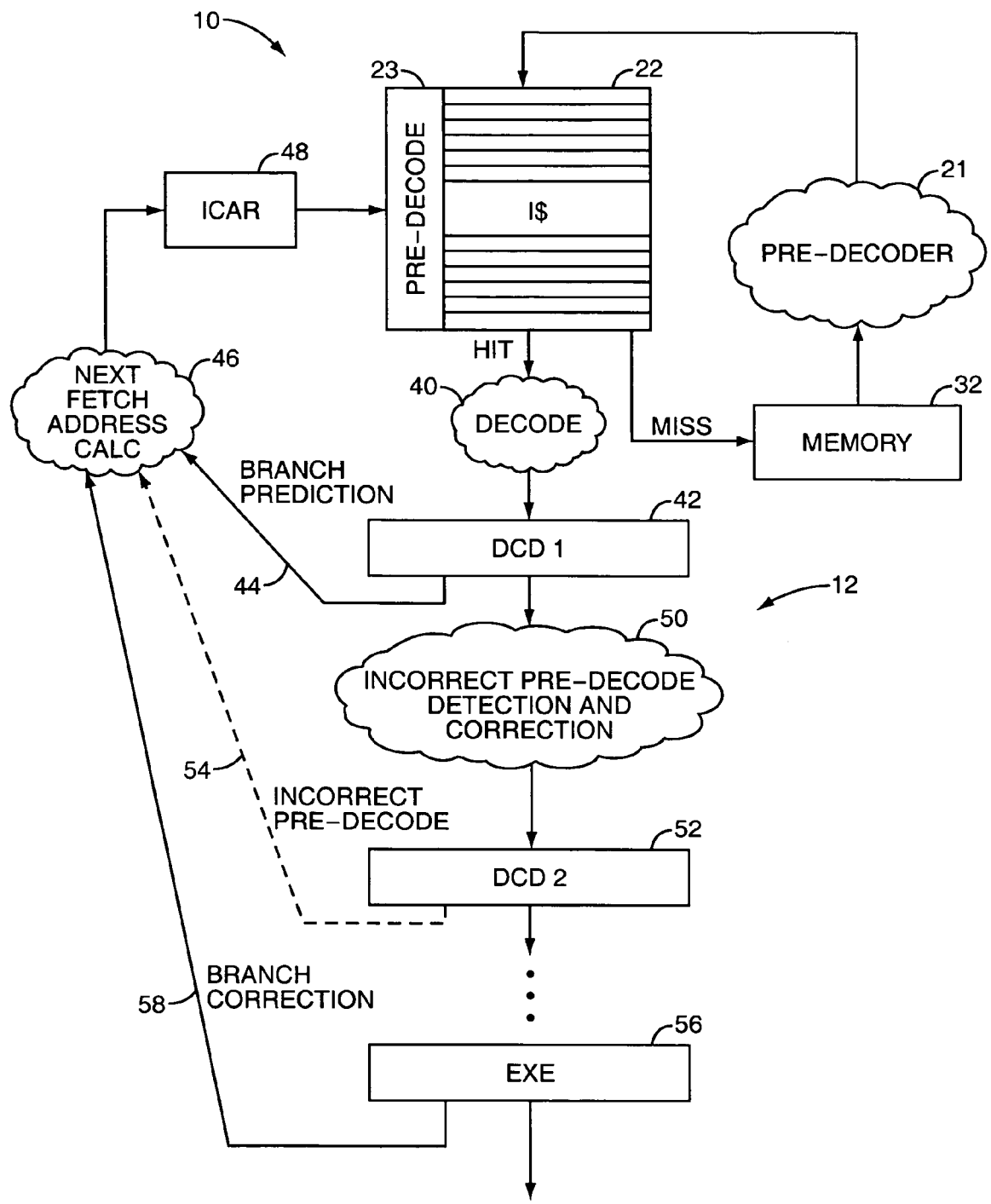
FIG. 2 is a functional block diagram of memory, a pre-decoder, an instruction cache and part of a processor pipeline.

There are ways to correct pre-decode errors that do not require causing an exception and associated flush of the pipeline 12. FIG. 2 is a functional block diagram depicting portions of the processor 10 and the pipeline 12. FIG. 2 also depicts an Instruction Cache Address Register (ICAR) 48, which indexes the I-cache 22. The address loaded into the ICAR 48 is generated and/or selected by the next fetch address calculation circuit 46. As instructions are fetched from memory 32 (or an L2 cache), they are pre-decoded by the pre-decoder 21 and pre-decode information 23 is stored in the instruction cache 22 along with the corresponding instructions.

In the pipeline 12, instructions and associated pre-decoded information 23 are fetched from the I-cache 22, at least partially decoded by decode logic 40, and the results stored in the DCD1 pipe stage latch 42. In many processors 10, the DCD1 pipe stage includes a branch predictor. In the cases that the branch predictor predicts a branch will be taken, the pipe stage may calculate a branch target address and provide it to the next fetch address calculation logic 46 along a branch prediction address path 44. This is one example of an address path from a pipe stage to the next fetch address calculation logic 46 (a branch predicted not-taken would simply allow sequential instruction fetching to continue).

The fetched and partially decoded instruction then flows, in an exemplary embodiment, to pipe stage DCD2 52, which includes incorrect pre-decode detection and correction logic 50. If an error in the pre-decode information is detected, the DCD2 pipe stage 52 may signal an exception and flush the pipeline 12, as discussed above.

Alternatively, the pre-decode error may be corrected by re-fetching the instruction from memory 32. One way to accomplish this is to invalidate the instruction in the cache 22, and provide the instruction address along path 54 to the next fetch address circuit 46. This address would then be loaded into the ICAR 48. Since the instruction was invalidated in the cache 22, the cache access will miss, causing an access to main memory 32. The instruction fetched from the main memory 32 will then be correctly pre-decoded by the pre-decoder 21 and placed back into the instruction cache 22. The instruction may then be re-fetched from the cache 22, along with the correct pre-decode information 23.

The next fetch address calculation logic 46 is commonly on the critical path of most processor dataflows, and thus limits the machine cycle time. Adding the path 54 for an instruction address associated with an incorrect pre-decode would add logic to the next fetch address calculation 46, increasing the machine cycle time and reducing performance. This performance hit is particularly egregious considering that pre-decoded information 23 is rarely incorrect. Optimizing performance for the rare case at the expense of the usual case commonly reduces overall processor performance.

According to one embodiment of the present invention, the incorrect pre-decode path 54 to the next fetch address calculator 46 is eliminated (as indicated by a dashed line in FIG. 2). Rather than provide a dedicated path to the next fetch address calculator 46, the incorrect pre-decode detection and correction logic 50 causes the pipeline 12 to evaluate the incorrectly pre-decoded instruction as a branch instruction. The pre-decode correction logic 50 may alter the semantics of the incorrectly pre-decoded instruction to those of a branch instruction, or alternatively may set a flag that is carried through the pipeline, the flag indicating to execution pipe stages that the instruction is to be treated as a branch.

In particular, the incorrectly pre-decoded instruction is evaluated as a branch that was predicted not taken and evaluated as taken, with the branch target address being the address of the incorrectly pre-decoded instruction. At some point down the pipeline 12 (depending on implementation details), the instruction is evaluated by an execute pipe stage 56 which evaluates the "branch taken" condition and generates the branch target address. The branch target address is provided to the next fetch address calculator 46 along branch correction path 58. The branch condition evaluation logic, branch target address generation logic, and the branch correction path 58 and associated control logic in the next fetch address calculator 46 already exist in every pipeline processor 10 that predicts branch behavior.

Figure 3:
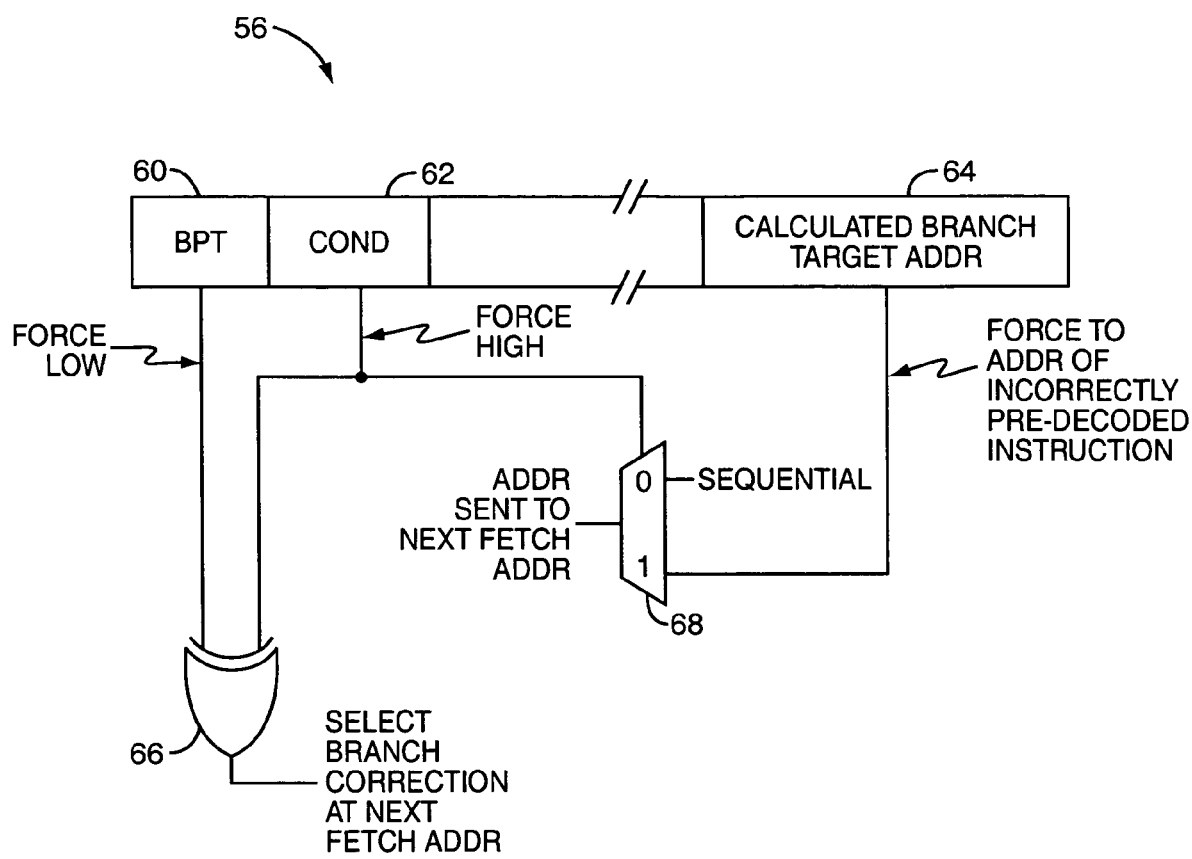
FIG. 3 is a functional block diagram of branch correction logic.

FIG. 3 is a functional diagram of one possible implementation of the branch correction logic. Within the EXE pipe stage latch 56 are a Branch Predicted Taken (BPT) bit 60, and a branch condition evaluation (COND) bit 62. The BPT bit 60 is a one if the branch was predicted to be taken by the branch predictor early in the pipeline 12, and is a zero if the branch was predicted not taken. The COND bit 62 is a one if the branch evaluates as taken, and is a zero if the branch evaluates as not taken. These two bits may be XOR'ed, as indicated by gate 66, to generate a multiplexer select or similar control signal that is provided to the next fetch address calculator 46, indicating that the branch correction path 58 should be selected as the next fetch address. Table 1 below depicts the truth table for the XOR 66.

TABLE 1

Branch Prediction Resolution Truth Table

| BPT | COND | output | comment |
|---|---|---|---|
| 0 | 0 | 0 | correctly predicted not taken; no correction |
| 0 | 1 | 1 | mispredicted not taken - must supply branch target address to next fetch address circuit on branch correction path |
| 1 | 0 | 1 | mispredicted taken - must supply sequential address to next fetch address circuit on branch correction path |
| 1 | 1 | 0 | correctly predicted taken; no correction |

The condition evaluation bit 62 may additionally serve as a select input to a multiplexer 68, which selects between a sequential address and a calculated branch target address 64 to generate the address placed on the branch correction path 58.

According to one embodiment of the present invention, to handle an incorrectly pre-decoded instruction, the BPT bit 60 may be set or forced to a zero, and the COND bit 62 may be set or forced to a one, to force a "branch mispredicted not taken" situation. In this case, the calculated branch target address 64 will be directed to the next address fetch circuit 46 via the branch correction path 58.

According to one embodiment of the present invention, the incorrectly pre-decoded instruction is evaluated as a PC-relative branch instruction, with a branch displacement field of zero. When this instruction is evaluated in the EXE pipe stage 56, the branch target address calculated will comprise the address of the erroneously pre-decoded instruction (with zero offset). In another embodiment of the present invention, the incorrectly pre-decoded instruction is evaluated as a register branch instruction, and additionally a branch target address register is loaded with the incorrectly pre-decoded instruction's address. Where the branch target address register is loaded by an arithmetic operation, the operand registers may be loaded so as to generate the incorrectly pre-decoded instruction address. Numerous other methods for evaluating an incorrectly pre-decoded instruction as a mispredicted not taken branch instruction having a target address of the instruction itself will be readily apparent to those of skill in the art, and are included within the scope of the present invention.

Referring again to FIG. 2, the forced mispredicted not taken branch instruction is executed at EXE stage 56, and a branch target address comprising the address of the incorrectly pre-decoded instruction is placed on the branch correction path 58. This address is selected by the next fetch address calculator 46, loaded into the ICAR 48, and an instruction fetch is performed in the I-cache 22.

Since the incorrect pre-decode detection and correction logic 50 invalidated the cache line containing the incorrectly pre-decoded instruction, the I-cache 22 access will miss, forcing the instruction to be fetched from memory 32 (or an L2 cache). The instruction will then be correctly pre-decoded by the pre-decoder 21, and placed, along with correct pre-decode information 23, into the I-cache 22. The instruction and pre-decode information 23 may then be re-fetched from the I-cache 22, correctly decoded, and correctly executed in the pipeline 12. An offset error due, for example, to data interspersed with instructions, will not reoccur in the pre-decoder 21, as the memory access is to the precise address of an instruction, rather than the beginning of a cache line.

Note that the above description of memory accesses is conceptual. In any given implementation, an access to memory 32 may proceed in parallel with an I-cache 22 access; the I-cache 22 miss may be predicted and hence the I-cache 22 access avoided; the memory 32 access results may go directly into the pipeline 12 in parallel with being written to the I-cache 22; and the like. In general, the present invention encompasses all memory and/or cache performance optimizations that in operation may deviate from the above description.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of correcting an incorrectly pre-decoded instruction, comprising:
   detecting a pre-decode error; and
   forcing a branch correction procedure with a target address of the incorrectly pre-decoded instruction, in response to detecting said error, wherein the pre-decoded instruction is evaluated as a branch instruction.

2. The method of claim 1 further comprising invalidating said incorrectly pre-decoded instruction in a cache prior to forcing said branch correction procedure.

3. The method of claim 2 further comprising fetching said instruction from memory in response to said branch correction procedure.

4. The method of claim 3 further comprising pre-decoding said instruction, and storing said instruction and pre-decode information associated with said instruction in said cache.

5. The method of claim 1 wherein forcing a branch correction procedure comprises forcing a branch condition TRUE and forcing a branch prediction FALSE.

6. The method of claim 1 wherein forcing a branch correction procedure with the target address of the incorrectly pre-decoded instruction comprises storing said address in a target address register and forcing a register branch instruction correction.

7. The method of claim 6 wherein storing said address in a target address register comprises, where said target address register is loaded with the results of an arithmetic operation on the contents of two operand registers, storing calculated values in said operand registers, said values calculated to yield said address from said arithmetic operation.

8. The method of claim 1 wherein forcing a branch correction procedure with the target address of the incorrectly pre-decoded instruction comprises forcing a PC-relative branch instruction correction with a zero branch displacement.

9. A processor, comprising:
   a pre-decoder interposed in an instruction fetch path, said pre-decoder generating pre-decode information associated with an instruction; and
   a pre-decode error detector and corrector detecting incorrect pre-decode information associated with said instruction, and forcing said instruction to execute as a mispredicted branch, with a branch target address of the address of said instruction.

10. The processor of claim 9 further comprising
   a cache memory storing said instruction and said pre-decode information, and wherein said pre-decode error detector and corrector further invalidates said instruction in said cache memory upon detecting said pre-decode error.

11. The processor of claim 9 further comprising a branch predictor and a branch correction path supplying a corrected branch target address for an instruction fetch in response to a conditional branch evaluated taken that was predicted not taken.

12. The processor of claim 11 wherein said pre-decode error detector and corrector utilizes said branch correction path to force said incorrectly pre-decoded instruction to execute as a mispredicted not taken branch instruction.

13. A method of correcting an incorrectly pre-decoded instruction, comprising:
   detecting a pre-decode error; and
   correcting said pre-decode error by fetching said instruction from memory and pre-decoding said instruction, in response to detecting said error, wherein the pre-decoded instruction is evaluated as a branch instruction.

14. The method of claim 13 wherein fetching said instruction from memory comprises:
   invalidating said instruction in a cache memory; and
   attempting to fetch said instruction from said cache memory after invalidating said instruction.

15. The method of claim 13 wherein fetching said instruction from memory comprises evaluating said instruction as a branch, with said instruction's address as a branch target address.

16. The method of claim 5 wherein evaluating said instruction as a branch comprises evaluating said instruction as a mispredicted branch not taken.

17. A method of correcting an incorrectly pre-decoded instruction, the method comprising:
   detecting a pre-decode error; and
   forcing a branch correction procedure with a target address of the incorrectly pre-decoded instruction in response to detecting the error;
   wherein forcing the branch correction procedure comprises forcing a branch condition TRUE and forcing a branch prediction FALSE.

18. A method of correcting an incorrectly pre-decoded instruction, the method comprising:
   detecting a pre-decode error; and
   forcing a branch correction procedure with a target address of the incorrectly pre-decoded instruction in response to detecting the error;
   wherein forcing the branch correction procedure with the target address of the incorrectly pre-decoded instruction comprises storing the target address in a target address register and forcing a register branch instruction correction.

19. The method of claim 18 wherein storing the target address in a target address register comprises loading the target address register with results of an arithmetic operation on the contents of two operand registers, storing calculated values in the operand registers, and to determine the target address from the arithmetic operation.

20. A method of correcting an incorrectly pre-decoded instruction, the method comprising:
   detecting a pre-decode error; and
   forcing a branch correction procedure with a target address of the incorrectly pre-decoded instruction in response to detecting said error;
   wherein forcing the branch correction procedure with the target address of the incorrectly pre-decoded instruction comprises forcing a program counter (PC) relative branch instruction correction with a zero branch displacement.

21. A processor, comprising:
   a pre-decoder interposed in an instruction fetch path, said pre-decoder generating pre-decode information associated with an instruction having an address;
   a pre-decode error detector and corrector to detect incorrect pre-decode information associated with said instruction and to force said instruction to execute as a mispredicted branch with a branch target address of the address of said instruction; and
   a branch predictor to supply a corrected branch target address for an instruction fetch in response to a conditional branch evaluated as taken that was predicted not taken.

22. The processor of claim 21 wherein said pre-decode error detector and corrector utilizes a branch correction path to force said incorrectly pre-decoded instruction to execute as a mispredicted not taken branch instruction.

* * * * *